United States Patent [19]

Ellis et al.

[11] Patent Number: 4,997,559

[45] Date of Patent: Mar. 5, 1991

[54] AQUARIUM FILTER ASSEMBLY WITH RESTRICTED PUMPING WINDOW

[75] Inventors: Robert Ellis, Wyckoff; Allan H. Willinger, Franklin Lakes, both of N.J.

[73] Assignee: Willinger Brothers, Inc., Oakland, N.J.

[21] Appl. No.: 395,770

[22] Filed: Aug. 18, 1989

[51] Int. Cl.$^5$ .............................................. E04H 4/12
[52] U.S. Cl. ................................ 210/169; 210/416.2; 415/182.1
[58] Field of Search .................. 415/121.2, 206, 182.1; 210/169, 416.2

[56] References Cited

U.S. PATENT DOCUMENTS

| | | | |
|---|---|---|---|
| 3,892,663 | 6/1973 | Wiedenmann | 210/416.2 |
| 4,602,996 | 7/1986 | Willinger | 210/416.2 |
| 4,735,715 | 4/1988 | Willinger | 210/416.2 |

Primary Examiner—Stanley Silverman
Assistant Examiner—Robert Simpson
Attorney, Agent, or Firm—Helfgott & Karas

[57] ABSTRACT

An external aquarium filter having a housing which is mountable onto a wall of an aquarium tank. The housing includes an intake compartment and a filter compartment which in turn includes a contaminated water chamber receiving contaminated water drawn into the intake compartment from the aquarium tank and a filter chamber for filtering the water. A motor unit supported at the filter housing has an impeller which sits into it depending from a collar which fits into the intake compartment of the filter. The impeller draws water from the aquarium tank into the intake compartment of the filter. The impeller is encased in a tubular collar. The tubular collar has two opposing windows. The window, which faces the front wall of the intake compartment, is offset in a clockwise direction, as viewed from above, relative to the window which faces the rear wall of the intake compartment, to effectively close off the right edge thereof, to thereby reduce turbulence in the water flowing in the filter.

18 Claims, 3 Drawing Sheets

4,997,559

AQUARIUM FILTER ASSEMBLY WITH RESTRICTED PUMPING WINDOW

BACKGROUND OF THE INVENTION

The present invention relates generally to aquarium filtering systems and, more particularly, to an external aquarium filter utilizing a pump impeller for drawing contaminated water into an intake assembly inserted into the aquarium tank, pumping it through the filtering compartment of the filter, and then back into the aquarium tank. Even more particularly, the present invention relates to windows formed in the part of the collar surrounding the impeller and provided for discharging water pumped by the impeller from the intake assembly into the intake chamber of the filter.

Aquarium filters are typically utilized for the aeration and filtration of the aquarium water and at the same time, to provide circulation to such water. One type of aquarium filter is an externally mounted filter which houses filtration equipment and includes a pumping mechanism which induces the circulation of water from the aquarium tank through the filtration equipment and then returns the clean water to the aquarium. Such filter is described in U.S. Pat. Nos. 4,512,885 and 4,602,996 assigned to the assignee of the present invention, both of which are incorporated herein by reference.

In order to provide circulation of the water, a suitably adapted pumping mechanism is provided, a portion of which is within the water flow path. A motor stator is hermetically enclosed in a compartment below the intake chamber, and a rotor is magnetically coupled to the stator and positioned directly within the flow path. An impeller is coupled to the rotor such that it rotates with the rotor upon energization of the motor stator.

An intake assembly is provided in order to supply the contaminated aquarium water to the filter. The intake assembly includes a U-shaped intake tube having its inlet situated in the aquarium tank and its outlet seated in the intake chamber of the filter. The impeller is received in a collar projecting upward from the motor unit and into which sits the outlet end of the intake tube. Openings, respectively facing the front and the rear wall of the intake chamber, are provided in the peripheral wall of the collar at the level of the impeller vanes to permit the contaminated water drawn into the intake assembly to be discharged out of the intake tube and into the intake chamber from where it can flow into the filtering compartment, where the water is filtered and from which the clean water is returned into the aquarium.

The openings in the intake chamber walls are typically of the same size and diametrically opposed to each other relative to the central axis of the collar. A problem with such otherwise satisfactory opening arrangement occurs when a smaller power filter housing is used. In this case the front opening defined at the impeller output is located rather close to the front wall of the intake chamber of the filter housing. This limited spacing can cause turbulence in the flow of water in the filter even causing a possible upward surge of the water which can also lead to turbulence at the top surface of the water in the filter which may spill over the back edge of the filter, or which may spill over the intake chamber overflow on the aquarium side of the filter, prematurely signalling a clogged filter cartridge condition to the user.

SUMMARY OF THE INVENTION

It is an object of the present invention to provide a filter assembly that would eliminate the aforementioned problem.

It is another object of the present invention to provide a window arrangement at the impeller output of the intake tube of the filter assembly which would reduce the turbulence in the flow water at its top surface and prevent spillover on either the back edge of the filter or over the intake chamber.

In accordance with the present invention, there is provided an aquarium filter assembly which comprises a filter housing including a filter compartment with a filter disposed therein. The filter divides the filter housing into a contaminated water compartment and a clean water compartment. The filter housing also includes a water intake chamber connected to the filter compartment. An intake assembly is supported on the filter housing. An intake tube of the intake assembly has one leg insertable in the aquarium tank and a second leg which is in flow communication with the first leg and extends into the intake chamber. A motor unit is provided which drives an impeller unit. The impeller projects into the intake chamber and is connected to the second leg to form part of the intake assembly. The impeller pumps water from the aquarium tank through the filter. The impeller is coupled at the outlet of the second leg through a collar which is provided with opening formed at a front and a rear side thereof for permitting water pumped by the impeller to discharge therefrom into the intake chamber and then into the filter compartment. The opening at the front side is offset relative to the symmetrically located window at the rear side, whereby turbulence of the water discharged into the intake chamber is avoided.

In an embodiment, the width of the opening at the front side of the extension is smaller than that of the opening at the rear side.

In an embodiment of the invention, the offset is in a clockwise direction as viewed from above.

In an embodiment, two windows formed in the tubular extension are rectangular in configuration.

The aforementioned objects, features and advantages of the invention will, in part, be pointed out with particularity, and will, in part, become obvious from the following more detailed description of the invention, taken in conjunction with the accompanying drawing, which form an integral part thereof.

DETAILED DESCRIPTION OF THE PREFERRED EMBODIMENTS

Figure 2:
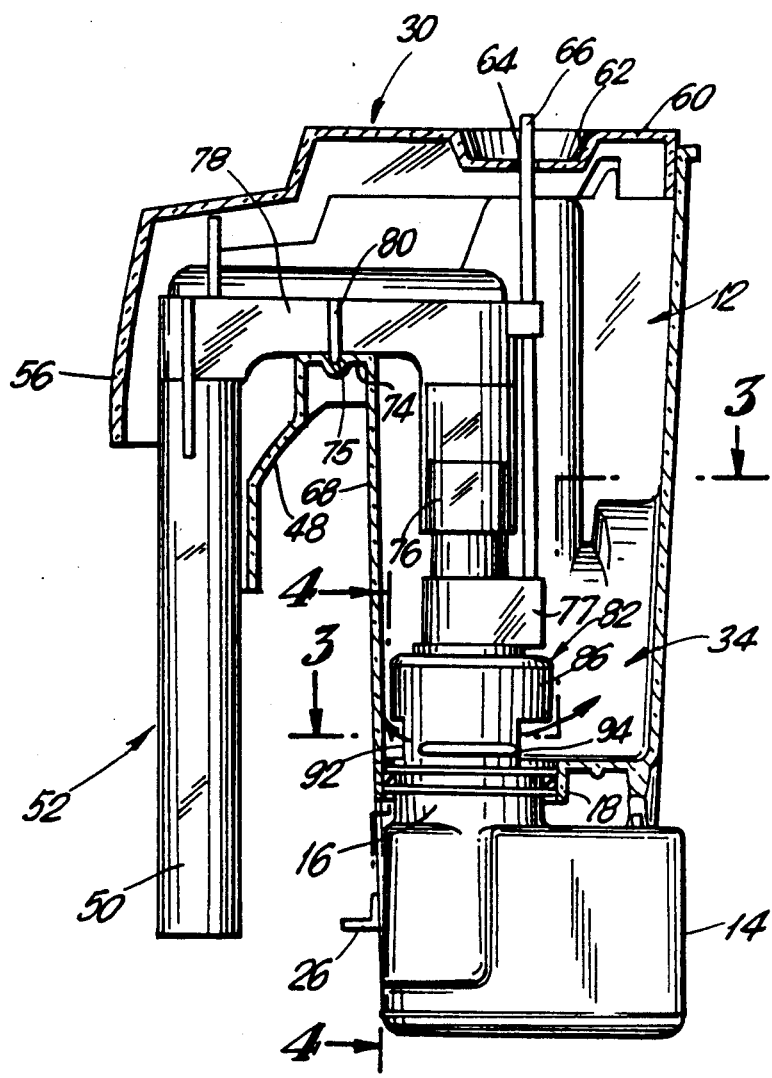
FIG. 2 is a sectional view taken along line 2—2 of FIG. 1.
Figure 3:
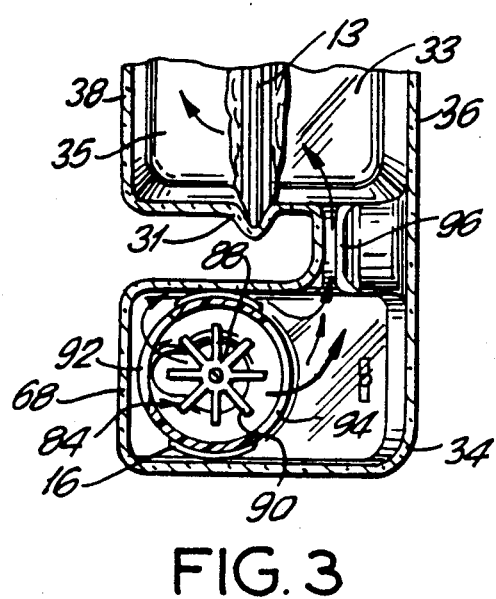
FIG. 3 is a partial sectional view taken along line 3—3 of FIG. 2.
Figure 4:
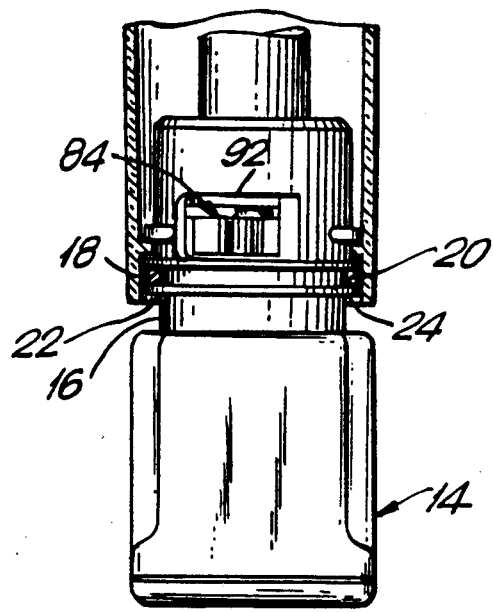
FIG. 4 is a partial sectional view taken along line 4—4 of FIG. 2.

Referring now to the drawings in detail, there is shown an aquarium filter apparatus which is designated generally by number 10 and comprises a tank 12 in which is typically disposed a sheet of filter material 13 (partially shown in FIG. 3). A motor housing 14 with an encapsulated stator and coil winding disposed thereon is connected to the tank 12 at its underside by means of a substantially cylindrical collar 16 projecting upwardly from motor housing 14 into the interior of tank 12. Collar 16 is snugly fit into a cylindrical opening 18 of tank 12 by means of a ring-shaped gasket 20 placed in a circular groove 22 formed between two spaced-apart circular ribs 24 provided on the outer face of collar 16 so that the motor housing is tightly coupled to the tank 12 as shown in FIGS. 2 and 4. An electric cord 25 (FIG. 1) terminated with a non-shown plug extends from the motor housing 14 for energization of the water.

Tank 12 is typically formed of transparent plastic material and is closed with a cover member 30 of the same material and disposed over the tank. Tank 12 is comprised of a filtering compartment 32 in fluid flow relationship with the chamber 34 into which the collar 16 of the motor housing 14 projects. The filtering section 32 has opposing lateral walls each provided with elongated vertical grooves 31 (FIG. 3) for removably receiving therebetween the sheet of filter material 13. The latter forms and separates from each other a contaminated water-receiving chamber 33 also limited by a rear wall 36, and receiving the aquarium water from the intake chamber. On the front side of the filter sheet is a clean water chamber 35 (FIG. 3) which is defined between the filter material sheet 13 and a front wall 38 of the filter housing. When inserted into the filtering section 32 the filter sheet 13 substantially fills the entire height of the aquarium filter 10. The upper end of the front wall 38 terminates in a downwardly directed, arcuately shaped forward wall 40 which forms a spillway for water flowing from the clean water chamber 35 back into the aquarium tank. The forward wall 40 is terminated in a peripheral lip portion 42. A standoff 26 spaces the tank from the aquarium.

Figure 1:
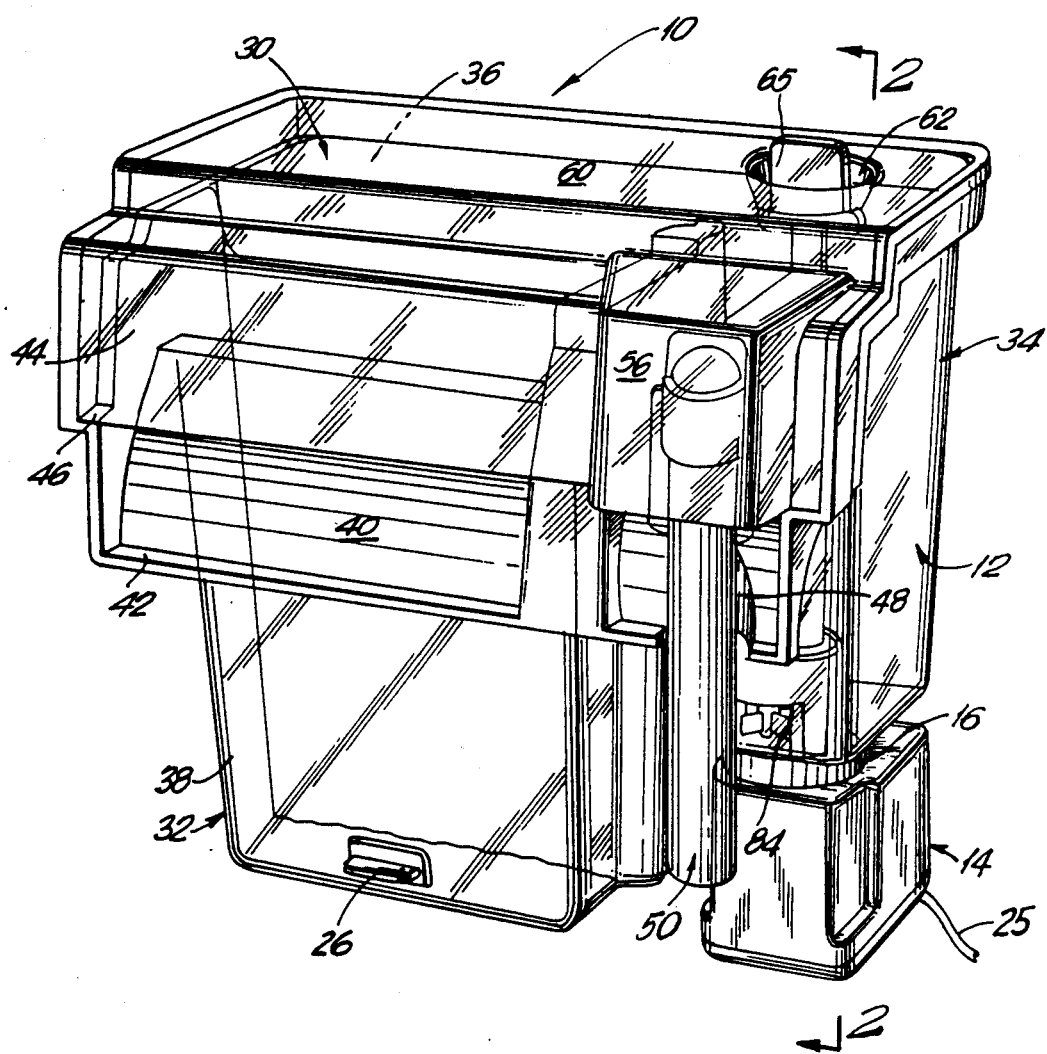
FIG. 1 is a perspective view of the aquarium filter assembly in accordance with the present invention.

Cover member 30 is shaped to conform to a stepped shape of the top edge of the tank 12, as can be seen from FIGS. 1 and 2. At the front side thereof, the cover member 30 has a depending forward skirt portion 44 which conforms with and sits on a lateral flange 46 provided on the filtering section 32 of tank 12. In the region of intake chamber 34, the forward wall 40 is formed with a recess 48 open downwardly and having a substantially semicircular cross-section for guiding a first leg of the intake tube 50 of the intake assembly 52. The cover member 30 is formed with a forwardly projecting pocket portion 56 to enclose and protect the upper end of intake tube 50.

Cover member 30 has a substantially horizontal upper wall 60 which is formed with a frusto-conical downwardly directed recess 62. A central slit 64 extending longitudinally of the base of the recess receives an upper edge 65 of a flow control gauge 66 of the intake assembly 52.

As can be best seen in FIG. 2, a front wall 68 of the intake compartment 34 is connected to the arcuate forward wall 40 at an upper edge by a bridge portion 74. The lower wall of the bridge portion 74 is provided with a groove 75.

The intake assembly 52 comprises the intake or tube 52 as mentioned above The intake assembly is made of plastic transparent material and is of a substantially inverted U-shaped configuration so that it includes a first vertical leg denoted at 50, a second vertical leg 76 parallel to leg 50 and also of circular cross-section, and a horizontal connecting leg 78 which connects legs 50 and 76 to each other. The three legs are in flow communication with one another. The vertical legs 50 and 76 are open downwardly and leg 50 terminates at its lower end at a level lower than the termination of the leg 76.

The lower surface of the interconnecting leg 78 is flat which enables the intake assembly 52 to sit on the lower wall 74 of the bridge portion 72. About the periphery of the interconnecting leg 78 is provided a flange 80. The outer or peripheral edge of flange 80 forms a knife edge which is inserted in groove 75 to secure the position of the intake assembly 52 on the bridge portion 74 of the tank.

The outlet end 82 of leg 76 fits into an upper portion 86 of the collar 16 projecting from the motor 14. Extending from the outlet end 82 is the impeller and rotor which sits in a well formed within the encapsulated stator so as to be magnetically driven by the stator. The intake assembly in conjunction with the rotor and impeller form a unitary assembly for removal when needed for cleaning, or the like. Ring 77 is coupled to the rod 66 and can be moved up or down to control the flow rate as is described in U.S. Pat. No. 4,842,727 assigned to the assignee of the present invention and incorporated herein by reference.

Figure 6:
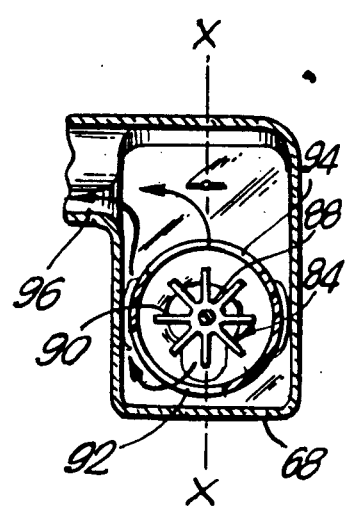
FIG. 6 is a partial sectional view taken along line 6—6 of FIG. 5.

The motor assembly and the impeller utilized in the filter apparatus according to the invention are known and disclosed in detail in applicant's U.S. Pat. No. 4,512,885 which is incorporated herein by reference. As best seen in FIGS. 3 and 6, impeller 84 includes a central circular hub 88 from which radially outwardly extend fins or vanes 90.

Referring now to FIGS. 3 and 4 which illustrate a first embodiment of the present invention, it will be seen that collar 16 of the motor assembly 14 is provided with two rectangular cutouts or openings 92 and 94 formed at two diametrically opposing faces of the collar 16 and facing respectively the front vertical wall and the rear vertical wall of intake chamber 34. In the conventional construction, the openings formed in the collar are of the same size and diametrically opposed to each other relative to a central vertical diametric plane of the collar 16. As best seen in FIGS. 3 and 4, in the first embodiment of the present invention, the front cutout or opening 92 has a portion closed off on its right side, as viewed facing the filter. As a result, the opening opening in the front is offset in a clockwise direction as viewed from the top.

When the intake assembly 52 and rotor assembly 14 is positioned in the filter the intake leg 50 will reach into the aquarium water With the motor energized the impeller 84 will rotate to draw the water into intake tube 50. The contaminated water entering the intake leg 50 will flow through connecting leg 78 and down the second vertical leg 76. As the impeller operates within the collar 16 the water will be discharged through opposing opening 92 and 94 outwardly and into the intake chamber 34. The water filling the chamber 34 thus flows into the filtering section 32.

Without the offset of the front opening 92, it was found that in small volume filters, the spacing between the collar and the front wall of the intake chamber is small which caused a turbulence in the flow of the water from the collar into the intake chamber. The turbulence could get rough enough to cause a geyser effect whereby a stream of water would even rise to the top surface of the water level and possibly spill over the back edge of the filter or over the front of the intake chamber.

By closing off a part of the front opening 92 which is close to the front wall 68 of the intake compartment 34, the turbulence has been reduced. The effect is most pronounced when it is closed on the right side to offset the window opening in a clockwise direction and thereby restricting the front opening on the right side. The rear opening window is left full-sized. In this way significant turbulence in the water was reduced. This substantially eliminated the upward water surge and surface turbulence. The water discharged through the openings could follow a path as indicated by the arrows in FIG. 3.

Figure 5:
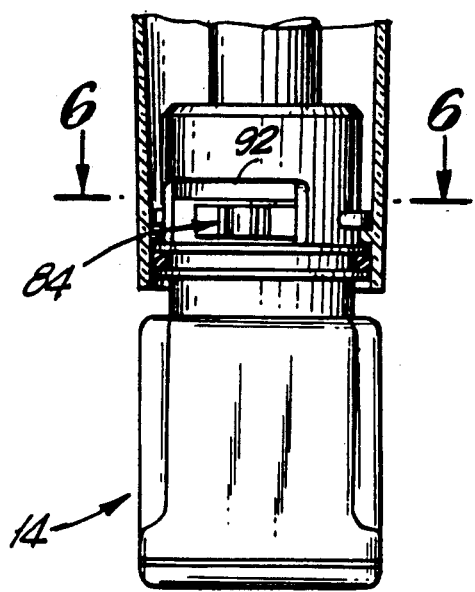
FIG. 5 is a view similar to that of FIG. 4 but showing another embodiment of the invention.

In the embodiment of FIGS. 5 and 6, both openings 92 and 94 are full-sized. However, while the rear opening 94 is symmetrically positioned with respect to the vertical central plane X—X of the collar 16, the front opening 92 is shifted or angularly offset in the clockwise direction relative to opening 94 so that the part of the front opening 92 extending rightwardly from plane X—X is again restricted. The direction of the flow of water pumped through openings 92 and 94 is shown by arrows in FIG. 6.

As shown in both embodiments of the invention, skewing the front opening 92 towards the left or in a clockwise direction from the central vertical plane X—X causes the water pumped out of the openings 92,94 to flow around the collar 16 into passage 96 without causing turbulence, especially at the top part of intake compartment 34. The right side of the opening 92 is thereby restricted.

There has been disclosed heretofore the best embodiment of the invention presently contemplated. However, it is to be understood that various changes and modifications may be made thereto without departing from the spirit of the invention.

What is claimed is:

1. An aquarium filter assembly, comprising:
   housing means including a filter compartment for receiving filter means disposed therein, and an intake compartment in flow communication with said filter compartment;
   an intake assembly supported on said housing means and including an inlet for insertion into an aquarium tank and an outlet in flow communication with said inlet and extending into said intake compartment; and
   a motor unit including an impeller unit projecting into said intake compartment and coupled to said outlet for discharging water received therethrough;
   said impeller unit including an impeller and encasing means surrounding said impeller within said intake compartment and receiving said outlet,
   said encasing means including openings provided therearound for permitting water discharged by said impeller to flow out from said encasing means into said intake compartment and upwardly therefrom into said filter compartment,
   wherein at least one opening is angularly offset relative to the next opening so that the openings are non-symmetrically positioned relative to a vertical central plane of said encasing means, whereby turbulence of the water flowing into said intake compartment is reduced.

2. An assembly as in claim 1, wherein there is provided on said encasing means a front and a rear opening, and wherein said front opening is offset with respect to said rear opening.

3. An assembly as in claim 2, wherein said front window opening is shifted in a clockwise direction relative to the rear opening, as viewed from above.

4. An assembly as in claim 3, wherein said opening at said front side is narrower than said opening at said rear side.

5. An assembly as in claim 2, wherein said openings are of the same size.

6. An assembly as in claim 1, wherein said motor unit has a housing positioned below said intake compartment and said encasing means is a tubular collar of said housing encompassing said impeller.

7. An assembly as in claim 4, wherein said openings are rectangular cutouts in said tubular collar.

8. An assembly as in claim 1, wherein said intake assembly has s substantially inverted U-shaped configuration with a first tube and a second tube forming two parallel legs interconnected by a connecting piece.

9. As assembly as in claim 8, wherein said impeller is positioned at a level of said openings.

10. An assembly as in claim 9, wherein said impeller is positioned approximately at a level of a lower end of said first tube.

11. An assembly as in claim 2, wherein said front window opening is smaller than said rear opening.

12. An aquarium filter assembly, comprising:
    housing means including a filter compartment for receiving filter means disposed therein, and an intake compartment in flow communication with said filter compartment;
    an intake assembly supported on said housing means and including an inlet for insertion into an aquarium tank and an outlet in flow communication with said inlet and extending into said intake compartment; and
    a motor unit including an impeller unit projecting into said intake compartment and coupled to said outlet for discharging water received therein;
    said impeller unit including an impeller and encasing means surrounding said impeller within said intake compartment and receiving said outlet,
    said encasing means including two openings provided at a front and a rear side thereof for permitting water discharged by said impeller to flow out from said encasing means into said intake compartment and therefrom into said filter compartment, wherein an opening at said front side is angularly offset relative to a n opening at said rear side by an angle differing from 180°, whereby turbulence of the water flowing within said intake compartment is reduced.

13. An assembly as in claim 12, wherein said impeller is positioned at a level of said openings.

14. An assembly as in claim 12, wherein an opening at said front side is of a width smaller than that of an opening at said rear side.

15. An assembly as in claim 14, wherein said collar is cylindrical and said openings are rectangular in configuration.

16. An aquarium filter assembly, comprising:
    housing means including a filter compartment for receiving filter means disposed therein, and an intake compartment in flow communication with said filter compartment;
    an intake assembly supported on said housing means and including an inlet for insertion into an aquarium tank and an outlet in flow communication with said inlet and extending into said intake compartment; and a motor unit including an impeller unit projecting into said intake compartment and coupled to said outlet for discharging water received therethrough;

said impeller unit including an impeller and encasing means surrounding said impeller within said intake compartment and receiving said outlet, said encasing means including a front opening and a rear opening for permitting water discharged by said impeller to flow out from said encasing means into said intake compartment and upwardly therefrom into said filter compartment, said front opening being offset relative to the rear opening, whereby turbulence of the water flowing into said intake compartment is reduced, wherein said front opening is smaller than said rear opening.

17. An aquarium filter assembly, comprising:

housing means including a filter compartment for receiving filter means disposed therein, and an intake compartment in flow communication with said filter compartment;

an intake assembly supported on said housing means and including an inlet for insertion into an aquarium tank and an outlet in flow communication with said inlet and extending into said intake compartment; and a motor unit including an impeller unit projecting into said intake compartment and coupled to said outlet for discharging water received therethrough;

said impeller unit including an impeller and encasing means surrounding said impeller within said intake compartment and receiving said outlet, said encasing means including two openings provided at a front and a rear side thereof for permitting water discharged by said impeller to flow out from said encasing means into said intake compartment and therefrom into said filter compartment, wherein an opening at said front side is angularly offset relative to an opening at said rear side, whereby turbulence of the water flowing within said intake compartment is reduced, and wherein the opening at the front side is of a width smaller than that of the opening at the rear side.

18. An assembly as in claim 17, wherein said openings are rectangular in configuration.

* * * * *